Patented Feb. 20, 1934

1,947,497

UNITED STATES PATENT OFFICE 1,947,497

WATER PAINT

Herman A. Scholz, Oak Park, Ill., and Wilbur S. Randel, Farnams, Mass., assignors to United States Gypsum Company, Chicago, Ill., a corporation of Illinois No Drawing. Application August 23, 1930, Serial No. 447,477. Renewed May 12, 1933

7 Claims. (Cl. 134—46)

This invention relates to paint, and has reference more particularly to paints of the water type, suitable for application to interior walls of buildings and other surfaces.

In paints for application to walls and ceilings of room interiors, it is desirable to have a paint which mixes with water to proper consistency and which can be easily applied with a brush to give a large coverage per unit volume and an extremely white film. It is also desirable to have a water paint which may be mixed with agents for improving the resistance to washing and to wear, and so as to make the paint more elastic, these agents consisting of linseed oil, varnishes, turpentine or other organic liquids. In addition to the above desirable qualities, it is important that powdered casein be introduced into the composition in such a way that lumping will not occur and so that the resulting paint film will be hard, durable and water resistant.

An object of this invention, therefore, is to provide a paint composition which will combine the desirable qualities, above enumerated, to produce a paint highly effective for the coating of interiors of buildings; also to improve paint compositions and their methods of preparation in other respects hereinafter specified and claimed.

One example, or preferred formula for our improved paint composition, is as follows:

| | |
|---|---|
| Borax | 2 % |
| Casein | 6 % |
| Mineral filler | 59.7% |
| Titanium pigment | 20 % |
| Zinc oxide | 3 % |
| Irish moss | 0.1% |
| Hydrated lime | 9 % |
| Tribromophenol | 0.2% |

Water; 6-8 gallons per 100 pounds of dry paint

After the water is thoroughly mixed with the paint, linseed oil is thoroughly mixed into the wet paint in the proportion of 3-7 quarts of oil to one hundred pounds of the dry paint.

The principal function of the casein is to act as a binder for the paint and impart hardness, durability and water-resistance. It also serves as an emulsifying agent if oils are added to the paint. It is preferably coated with mineral oil or other water repellent substances to slow up the rate of solution and lessen lumping. It should not be so fine as to cause lumping, nor should it contain coarse particles which will go into solution too slowly. The preferred screen analysis is as follows: All through 40 mesh, through 40 on 100 mesh—30 to 45%, through 100 mesh—55 to 70%. The proportions may be varied between 4% and 12%.

The mineral filler used is composed principally of tremolite and dolomite in major proportion and smaller amounts of talc, silica, calcite, etc. This filler is very white and serves as the body of the paint. It carries the other ingredients in the paint and at the same time imparts considerable hiding power or opacity. It adds to the brushing and leveling qualities of the paint. It may be replaced in whole or in part by other inert fillers, such as calcium, magnesium or barium carbonates, by silicates such as keolin, talc or mica, by silica, by barium sulphate or calcium sulphate in their various forms, or by other fillers of similar material, or by mixtures of any of these. The percentage may vary from 0 to 70%.

The titanium pigment preferred is an intimate mixture of titanium dioxide and barium sulphate, containing about 25% of the titanium dioxide and 75% barium sulphate. This titanium pigment is usually prepared by precipitating titanium dioxide on barium sulfate. Other titanium pigments may be used, such as pure titanium oxide or various mixtures of pure titanium oxide with barium sulphate, calcium sulphate, or other inert fillers. The titanium pigment adds greatly to the opacity of the paint and increases the ability to hide or to obscure the surface to which it is applied. The titanium dioxide pigments, because of their inertness toward most chemical agents, ordinarily encountered, are particularly adapted for use in water paints of this nature. The amount of titanium pigments present may vary between 10% and 80%.

The zinc oxide is a pigment which adds to the whiteness and the hiding qualities of the paint. This ingredient has one unique property in that it combines to a certain extent with the casein to form a gell. This gell improves the brushing qualities and also the resistance to moisture of the dry paint film. The zinc oxide may be varied between 1% and 5%.

The Irish moss or chondrus, prevents settling of the mixed paint. It may be replaced by pectin, agar-agar, or similar gelling agents. The amount may be increased, decreased, or this ingredient may be entirely eliminated.

The hydrated lime may be from either high calcium or dolomitic lime. A white product is to be preferred. The lime acts both as a solvent for the casein, and, also as an insolublizer. A high calcium lime is preferred as there is less danger of it aging in the package. The proportion of the lime may vary from 4% to 12%.

The borax acts as a solvent for the casein and also aids in preventing lumps when the casein goes into solution. Its most important function is the prevention of mold growth. We have discovered that in a casein paint containing lime, the borax greatly retards the growth of mold, and any mold which does grow, is white or very light pink or orange. In the absence of borax, the mold growths are usually colored dark brown, green or even black. When tribromophenol is added to the borax, mold growth is entirely prevented in most cases, and where it does occur, the mold form is always white and is in no case dark colored, so as to be noticeable. There seems to be a peculiar interaction between the borax and the tribromophenol which entirely prevents the formation of mold.

Instead of linseed oil, other drying oils may be used as well as certain varnishes, or turpentine and turpentine substitutes. The main function of the oil is to form an emulsion with the rest of the paint ingredients and also to improve the resistance to washing and the wearing qualities of the resulting paint film. The oils also make the paint film more elastic and the wet paint more easily applied with a brush.

We would state in conclusion that while the above examples constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. A paint composition comprising a mineral filler, casein, titanium pigment, zinc oxide, Irish moss, hydrated lime, borax, and tribromophenol.

2. A paint composition comprising the following ingredients in the proportions named, casein 4–12%; mineral filler 1–70%, titanium pigment 10–80%; zinc oxide 1–5%; Irish moss 0.1%; hydrated lime 4–12%; borax 2%, tribromophenol 0.2%.

3. A paint composition comprising the following ingredients substantially in the proportions named, casein 6%; mineral filler 59.7%; titanium pigment 20%; zinc oxide 3%; Irish moss 0.1%; hydrated lime 9%; borax 2%; tribromophenol 0.2%.

4. A paint composition comprising a mineral filler, casein, a titanium pigment, hydrated lime, a mold preventing agent comprising borax and tribromophenol, water and a vegetable drying oil.

5. A paint composition comprising a mineral filler, casein, zinc oxide, hydrated lime, a mold preventing agent comprising borax and tribromophenol, water and linseed oil.

6. A paint composition comprising a mineral filler, casein, a pigment, hydrated lime, and a mold preventing agent comprising borax and tribromophenol, the mixture of the above ingredients being mixed with water and a vegetable drying oil to painting consistency.

7. A paint composition comprising a mineral filler, casein, a pigment, hydrated lime, borax, and tribromophenol.

HERMAN A. SCHOLZ.
WILBUR S. RANDEL.